Dec. 29, 1931.  F. FIORELLI  1,838,541
SIEMENS-MARTIN FURNACE
Filed July 29, 1929
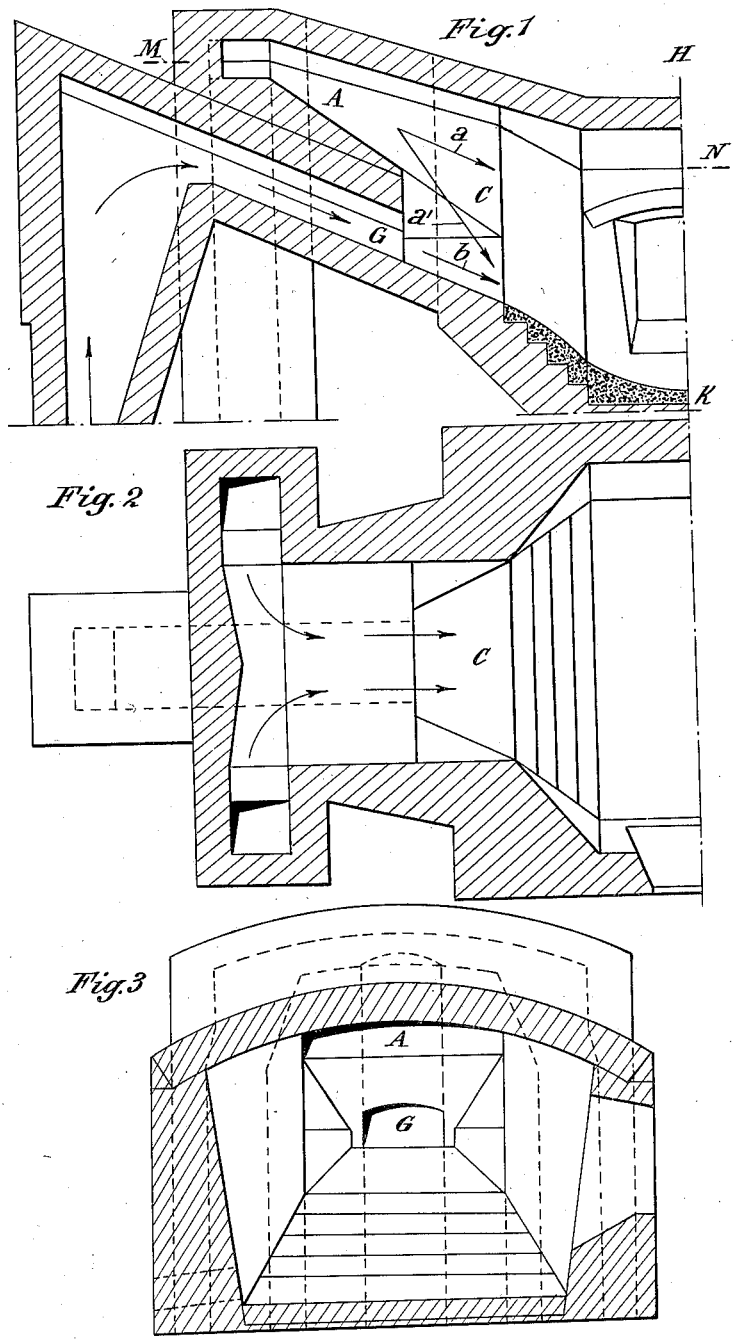

Patented Dec. 29, 1931

1,838,541

UNITED STATES PATENT OFFICE

FERDINANDO FIORELLI, OF TERNI, ITALY, ASSIGNOR TO THE FIRM "TERNI" SOCIETA PER L'INDUSTRIA E L'ELETTRICITA, OF TERNI, ITALY

SIEMENS-MARTIN FURNACE

Application filed July 29, 1929, Serial No. 381,966, and in Italy April 6, 1929.

This invention comprises the application to a Siemens-Martin furnace of a combustion chamber of a form adapted for varying the incidence angle between the direction of air and of gas, and therefore the velocity of the mixture of the two fluids in order to augment the useful effect of the flame in the operative combustion chamber.

In the accompanying drawings,

Figure 1 is a section of the head on a longitudinal central plane;

Figure 2 is a section along the broken line M—N in Figure 1, and

Figure 3 is a cross section of the operative combustion chamber.

The following describes the operation, from the thermic point of view, of normal Siemens-Martin furnaces in which gas and air unite in the operative combustion chamber, and furnaces built for the purpose of obtaining combustion in the smallest time and space possible.

A characteristic feature of the run of the normal furnace is the generation of an imperfect gas and air mixture and thence a slow and imperfect combustion. The phenomena of the different phases of the metallurgical operation are as following:

In the first period (from the beginning of charging to the formation of the bath) the combustion is hindered by the heap of cold scrap iron, and a material quantity of gas is burnt in the recovery chambers. During this period heavy losses of heat occur and the temperature of the operative combustion chamber remains low with a consequent low melting.

In the subsequent periods (completion of melting and refining) the flow of burning gas passes through the operative combustion chamber between an upper layer of excess air and a lower of unburnt gas.

Experience shows that the development of flame thus obtained, the operation of the furnace being well regulated, brings about thermic conditions favorable to the transmission of heat to the bath.

The slow combustion therefore is convenient in the period of working and in that of refining, but not so efficient in melting. The latter condition forms the principal cause of low output of furnace.

With a view of conquering this difficulty arising from the normal disposition of the arrivals, a mixing chamber is used in the Siemens-Martin furnace, i. e. a space in which the mixture between gas and air is effected before entrance into the operative combustion chamber, so as to make the combustion rapid and complete.

A very hot flame is thus obtained which acts energetically on the charge thereby accelerating the melting.

It is however to be remarked that the advantageous action of the high temperature occurs in a notable way only in the period preceding working.

At this point the heat transmission conditions are unfavorably changed. The flame, having become short and dull in the excessively intense combustion process, does not maintain its radiating quality in a manner sufficient for a strong heat passage on the whole surface of the bath, and the last phase of melting is but poor.

In this case the combustion cannot be restored to the normal development by reducing the quantity of air. The minimum limit which ought to be reached for obtaining a good effect in the required direction would deprive the gas current of the indispensable inert mass and would prevent the flame from licking the bath.

Furthermore during nearly the whole time of operation the burnt gases, easily diffusible and at a very high temperature, uniformly overheat the operative combustion chamber so as to cause rapid wear.

This is, in substance, the general thermic behaviour of normal furnaces and those with combustion chambers.

The solution of the problem according to invention represents a middle way between the two above mentioned extreme cases, and is based on the principle of obtaining by simple variation in the run of the furnace the complete mixture of gas and air, and thence rapid combustion, or alternatively normal combustion with free development of flame so as to satisfy constantly the various heat transmission conditions during the whole of the operation to be performed.

As indicated in the drawings, the head comprises a chamber C, Figs. 1–2, of a section increasing towards the operative combustion chamber into which open, with determined angles of inclination, the superposed gas and air conduits G and A, respectively.

The effect aimed at is obtained through the combined action of a blower fitted to the air reversing valve, and the shape of the chamber the character of which, as stated, is to impart the air directions differing in relation to pressure.

In Figure 1 the arrow $a$ indicates the direction taken by the air when the pressure in the respective conduit or arrival perceptibly exceeds the pressure in the operative combustion chamber, whilst arrow $a'$ indicates the direction obtained in case of less difference of pressure.

This different opening of angle of incidence between the variable direction of air and constant direction of gas (arrow $b$, Figure 1) effects a more or less intimate mixture of the two fluids and consequently permits regulation of combustion in the desired sense.

It is to be noted that the air supplied at the beginning of the operation owing to the required pressure is not obnoxious, and in the same period also the quantity of gas admitted is higher.

Furthermore, not all of the air is used in combustion, a portion freely expanding so as to protect the vault.

*Advantages.*—As seen, the convenience of this system is derived from the possibility of so regulating the combustion as to create in the furnace the means best adapted for heat transmission in each of the characteristic phases of the Martin process.

In practice the following principal advantages are obtained:

1. Reduction of time necessary for the operation and therefore a larger output with notable economy of fuel.

2. Increase of life of furnace without necessity of resorting to artificial cooling means.

3. No oxidation occurring in operation.

Having now particularly described and ascertained the nature of the said invention and in what manner the same is to be performed, I declare that what I claim is:

1. A method of operating a furnace of the Siemens-Martin type provided with a combustion chamber and air and gas ducts consisting in supplying air at an increased pressure during the melting stage to cause the air to issue from the duct in angular relation to the gas stream issuing from the gas duct, and reducing the air pressure during the subsequent stage of refining and refinishing whereby the air is caused to move substantially parallel to the gas stream.

2. In a furnace of the Siemens-Martin type, a combustion chamber, and air and gas ducts communicating with the combustion chamber, the air duct increasing in cross section inclined toward the mixing chamber with the upper wall of the air duct parallel with the gas duct.

In testimony whereof I have hereunto signed my name.

FERDINANDO FIORELLI.